United States Patent [19]
Follett et al.

[11] Patent Number: 5,426,639
[45] Date of Patent: Jun. 20, 1995

[54] MULTIPLE VIRTUAL FIFO ARRANGEMENT

[75] Inventors: David R. Follett, Succasunna; Carol A. Tourgee, Morristown, both of N.J.

[73] Assignee: AT&T Corp., Murray Hill, N.J.

[21] Appl. No.: 799,812

[22] Filed: Nov. 29, 1991

[51] Int. Cl.$^6$ ............................................. H04J 3/24
[52] U.S. Cl. ................................... 370/94.1; 370/60; 371/10.1
[58] Field of Search .................. 370/94.1, 60, 85.2, 370/85.6, 91; 371/10.1

[56] References Cited

U.S. PATENT DOCUMENTS

| | | | |
|---|---|---|---|
| 3,917,933 | 11/1975 | Scheuneman et al. | 371/10.2 |
| 5,016,009 | 5/1991 | Whiting et al. | 370/102 |
| 5,046,023 | 9/1991 | Katsura et al. | 364/518 |
| 5,124,987 | 6/1992 | Milligan et al. | 371/10.1 |
| 5,157,654 | 10/1992 | Cisneros | 370/94.1 |
| 5,222,062 | 6/1993 | Sharma et al. | 370/94.1 |

OTHER PUBLICATIONS

Berztiss 'Data Structures' Academic Press New York, pp. 377-380, 415-420, 1975.
IBM Technical Disclosure Bulletin, vol. 32, No. 3B, Aug. 1989, pp. 488-492, "Algorithm For Managing Multiple First-in, First-out Queues . . . ".
IEEE Journal on Selectded Areas in Communication, vol. 9, No. 7, Sep. 1991, pp. 1110-1118, H. J. Chao "A Novel Architecture for Queue . . . ".
1989 IEEE International Conference on Computer Design Oct. 1989, pp. 466-471, G. L. Frazier et al, "The Design and Implementation of a Multi-Queue Buffer for VLSI Communication Switches".
J. Van de Lagemaat et al "Voice Transmission in a Priority CSMA/CD Law: and Efficient Protocol Using Hybrid Switching", Computer Communications Review, vol. 16, No. 3, Aug. 1986, New York US pp. 102-110.
D. Del Corso, "Bus Features for Real-Time Environments", Computer Standards and Interfaces, vol. 6, No. 1, 1987, Amsterdam NL pp. 17-25.
H. Kuranaga et al, "Intra-Office Data Network Architecture", Review of the Electrical Communications Laboratories, vol. 36, No. 2, Mar. 1988, Tokyo, Japan, pp. 195-200.

*Primary Examiner*—Douglas W. Olms
*Assistant Examiner*—Shick Hom
*Attorney, Agent, or Firm*—Frederick B. Luludis

[57] ABSTRACT

The operation of a packet switch having a plurality of port circuits is enhanced by including in a port circuit a virtual FIFO for each source of data packets that the port circuit serves, such that the storage capacity of a FIFO increases and decreases as required by the associated source.

20 Claims, 4 Drawing Sheets

MULTIPLE VIRTUAL FIFO ARRANGEMENT

TECHNICAL FIELD

The invention relates to buffering data packets received at a packet switch and more particularly relates to providing at a packet switch a virtual FIFO for each source of data packets.

BACKGROUND OF THE INVENTION

A data buffer, such as a FIFO memory buffer, is typically used to interface a source of data with a port circuit of a packet switch. In certain instances, a port circuit may serve a plurality of sources of data associated with different grades of service, including, for example, latency, reliability, bandwidth, etc. In such a situation, a data buffer is provided for each data source, with the data buffer sized to handle the transfer of a large file, taking into account the throughput of the associated packet switch. It can be appreciated, therefore, that if a port circuit is serving a large number of data sources, e.g., 512, then the port would have to be equipped with an equal number of data buffers. It can also be appreciated that the administration of a large number of data buffers would indeed be a complex task, thereby making the associated port circuit complex. Moreover, if each buffer is formed from a large number of memory locations, then the cost of equipping a port circuit with a large number of buffers would indeed be expensive.

SUMMARY OF THE INVENTION

An advancement in the art of packet switching is achieved by providing for each of a plurality of sources of data served by a port circuit a virtual FIFO having a storage capacity that dynamically increases and decreases as required by the associated source.

In an illustrative embodiment of the invention, a plurality of virtual FIFOs is implemented by partitioning memory internal to a port circuit into a plurality of data buffers, in which ones of the data buffers are associated with respective ones of the data sources. The remaining data buffers are then used to form a pool of data buffers such that, if the capacity of a data buffer associated with a source is exhausted, then that data buffer is linked to a data buffer obtained from the pool to increase the capacity of the associated data buffer. When a linked data buffer is emptied, then it is returned to the pool to decrease the capacity of the associated data buffer.

DETAILED DESCRIPTION

Figure 1:
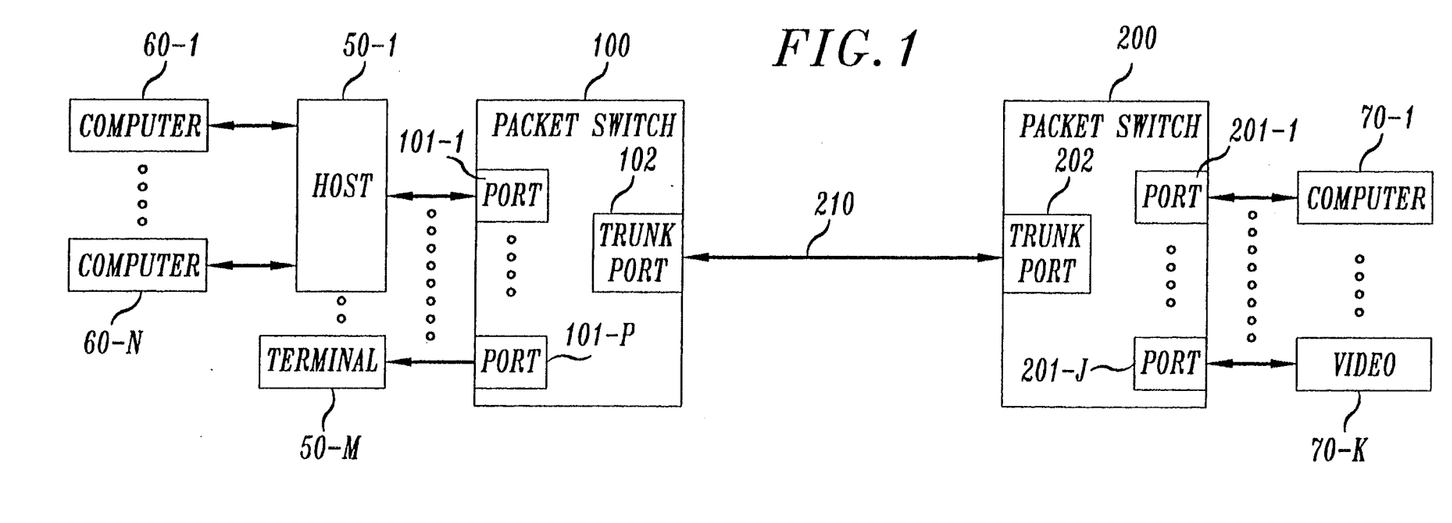
FIG. 1 is a broad block diagram of a telecommunications switching system in which the principles of the invention may be practiced.

FIG. 1 is a broad block diagram of a switching system comprising a plurality of telecommunications switches (e.g., packet switches), two of which, packet switches 100 and 200, are shown. As is well known, such packet switches may be arranged to exchange with one another data packets originated by respective sources of data, such as computers 60-1 through 60-N. In certain instances, one or more packet switches may serve as an intermediate switch between origination and destination packet switches.

Typically, a packet switch includes, inter alia, a controller, memory and clock circuit (not shown), which control the overall operation of the associated packet switch. A packet switch also includes a plurality of port circuits for interfacing the associated switch with respectively (a) sources of data packets, and/or (b) communications paths extending to other packet switches. For example, port circuits 101-1 through 101-P interface switch 100 with computers 60-1 through 60-N and terminal 50-M, respectively, whereas trunk port circuit 102 interfaces switch 100 with communications path 210 extending to switch 200. Each such port circuit is typically identified by a respective port address and is associated with one or more channel addresses (numbers). A port circuit uses such channel addresses to respectively identify the data circuits that the port circuit serves. Switch 200 having port circuits 201-1 through 201-J and trunk port 202, is similarly arranged. That is, port circuits 201-1 through 201-J present an interface to sources 70-1 through 70-K and trunk port 202 presents an interface to communications path 210.

The source computers may be any one of a number of different types of computers. They may be, for example, personal computers, so-called workstations or sources of images (video terminal). In addition, a plurality of computers may connect to a packet switch port circuit via a common interface, e.g., host computer 50-1. Accordingly, in this embodiment, computers 60-1 through 60-N supply data packets that they generate to host computer 50-1. Host computer 50-1, in turn, supplies packets that it receives to its associated port circuit 101-1 for storage in respective sequential locations of a port circuit 101-1 memory buffer.

Typically, a port circuit memory buffer presents an interface to a computer (or communications path) and may be, for example, a so-called First-In, First-Out (FIFO) memory. Data packets generated by a computer, or a number of computers, are thus stored in respective sequential locations of an associated port circuit FIFO. The associated port circuit, in turn, unloads the data packets in the order that they were stored in its associated FIFO and forwards them to their intended destinations.

It can be appreciated that under certain conditions, such as, for example, when a majority of the computers 60-1 through 60-N are active, port circuit 101-1 could receive via host 50-1 a steady stream of data packets. Moreover, one or more of the computers 60-1 through 60-N could be engaged in transferring very large files to other computers, either associated with switch 100 or another switch, such as switch 200. In such a situation, the buffer interface between host 50-1 and port circuit 101-1 could be overloaded, thereby possibly causing one or more data packets to be lost.

As mentioned above, one prior art arrangement deals with this problem by providing a port circuit input buffer, e.g., a FIFO, for each computer 60-1 through 60-N. In addition, each such input buffer is typically sized to handle the transfer of a very large file taking into account the capacity of the associated packet switch. It can be appreciated that if N is a large number, e.g., 512, then a corresponding number of port circuit input buffers would have to be provided. Moreover, if each such buffer is formed from a large number of memory locations, then the cost of providing the buffers would indeed be expensive.

We deal with this problem by initially assigning to each computer 60-1 through 60-N a small buffer that is sized to accommodate an average stream of data packets. Moreover, in accord with an aspect of the invention, the capacity of such a buffer is allowed to dynamically expand to accommodate an increase in the stream of data packets generated by the associated source computer.

Figure 2:
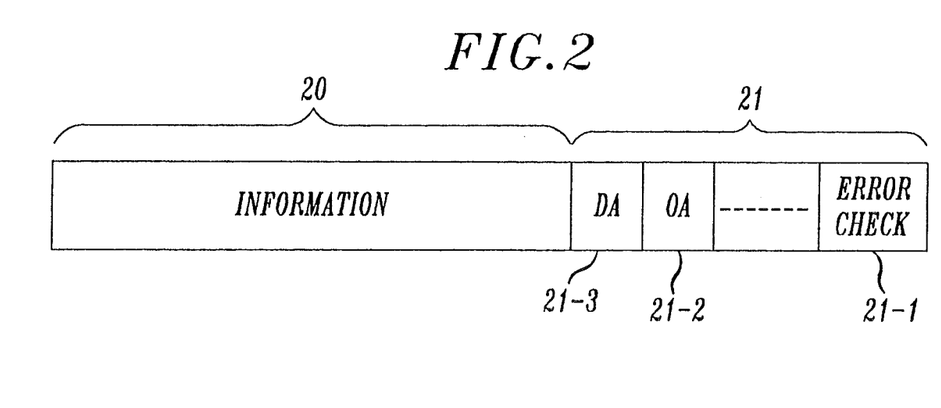
FIG. 2 is an illustrative example of the format of a data packet.

Before proceeding with a discussion of our invention, we believe it would be best at this point to discuss an illustrative format of a data packet that a port circuit, e.g, circuit 101-1, may receive at its input for storage in an associated data buffer. An illustrative format of a data packet is shown in FIG. 2 and may include a data information field 20 and header 21. As is well known, the data that a computer, or terminal, e.g., computer 60-1, sends to another computer is inserted in information field 20. As is also well known, a packet header typically contains, inter alia, a conventional error check field 21-1, OA field 21-2 identifying the address of the originator of the packet and DA field 21-3 identifying the intended recipient (destination) of the packet. In an illustrative embodiment of the invention, the address of the originator that is inserted in OA field 21-2 may include (a) a channel number associated with the sender of the data, (b) the address of the associated packet switch port circuit and (c) the address of the associated packet switch. The contents of DA field 21-3 may be similarly arranged.

Figures 3, 4:
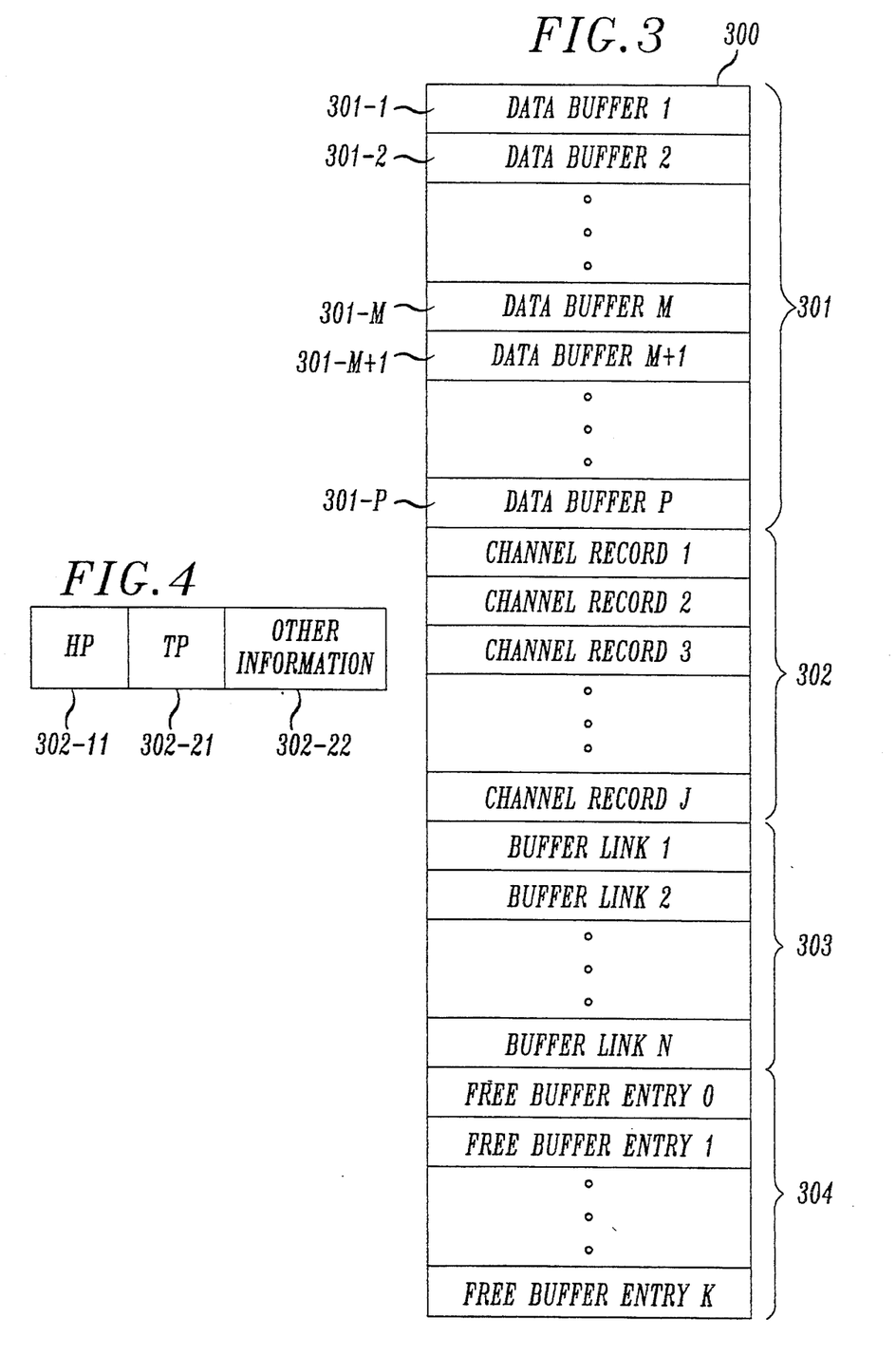
FIG. 3 illustrates the manner in which memory internal to particular ones of the port circuits of FIG. 1 is partitioned in accord with the principles of invention.
FIG. 4 illustrates the layout of a channel record of FIG. 3.

Turning now to FIG. 3, them is shown a block of memory 300 which is internal to a port circuit, e.g., port circuit 101-1 or trunk port 102. It is seen from the FIG. that memory 300 is partitioned into a number of sections 301 through 304. Section 301 comprises a number of data buffers—illustratively 1792 buffers—designated 301-1 through 301-P. Each such data buffer is formed from a predetermined number of bytes of memory 300, for example, 128 bytes with each byte having eight bits. When power is initially applied to a port circuit and the latter is therefore "booted up", a port controller (not shown) initializes the data buffers. In doing so, the port controller assigns to each of its associated channel addresses a respective data buffer and marks the remaining data buffers as being "free" (unassigned). For example, if the port circuit is associated with 512 channels, then 512 channels are initially assigned respective data buffers (e.g., buffer 1 through M). The remaining 1280 data buffers (e.g., buffers M+1 through P) are marked free. The free data buffers are used, in accord with an aspect of the invention, to increase dynamically the capacity of an assigned data buffer as needed.

Figure 6:
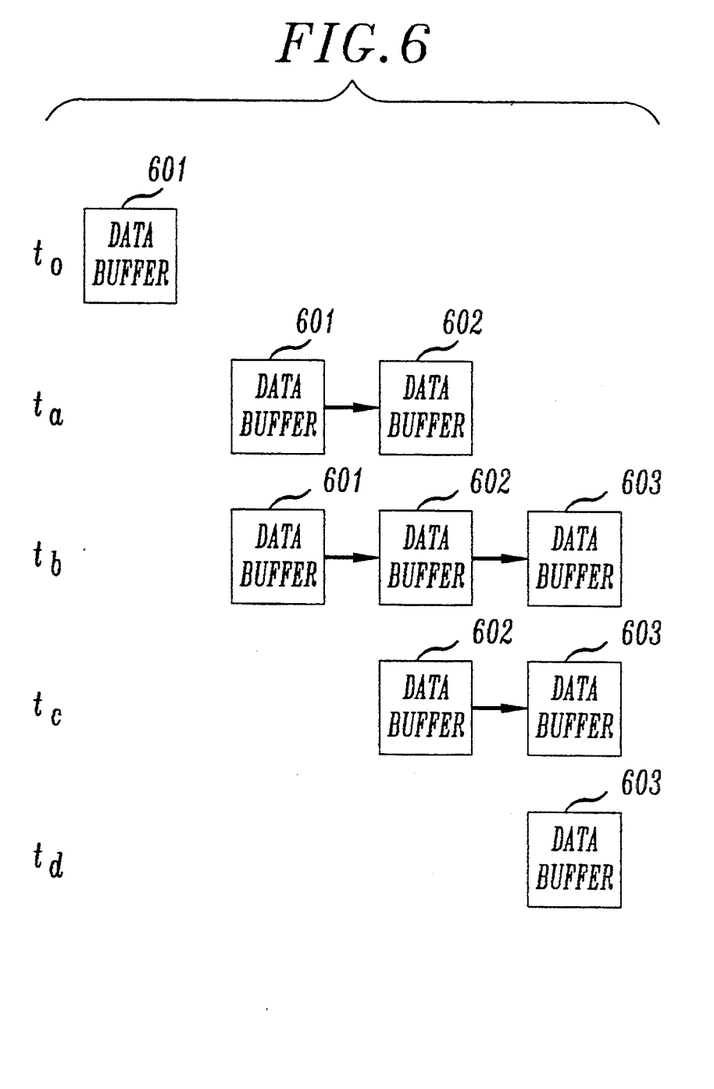
FIG. 6 is an illustrative example of the way in which a virtual FIFO expands and contracts in accord with the principles of the invention.

For example, assume that a computer, e.g., computer 60-1, is transmitting data packets at a rate faster than the rate at which port circuit 101-1 can unload data packets from the data buffer assigned to the channel number associated with computer 60-1. Also assume that, as shown in FIG. 6, the assigned data buffer is data buffer 601. As a result, data buffer 601 would become full at time $t_0$. To increase the data buffer capacity presently required by computer 60-1, then, in accord with an aspect of the invention, port circuit 101-1 increases the capacity of the assigned data buffer by linking a free data buffer 602 to the former data buffer at time $t_a$. Port circuit 101-1 then stores data packets newly received from computer 60-1 in the linked data buffer 602. If buffer 602 becomes full, then port circuit 101-1 links another free data buffer 603 to the priorly linked data buffer 602 at time $t_b$. In the general case, port circuit 101-1 continues to link free data buffers to one another as long as computer 60-1 requires the additional data buffer capacity.

Assume in the instant example that three buffers are adequate. When port circuit port 101-1 unloads from the initially assigned data buffer 601 the last of the data stored therein, then port circuit 101-1 marks buffer 601 as being free. Port circuit 101-1 at time $t_c$ then assigns buffer 602 to the associated channel number. Similarly, when port circuit unloads from buffer 602 the last of the data stored therein, then port circuit 101-1 marks buffer 602 as being free, as shown at time to. Port circuit 101-1 then assigns buffer 603 as the associated channel number. However, in accord with an aspect of the invention, the last of such linked data buffers, namely buffer 603, is not marked free, but, as shown at time t d, remains assigned to the associated channel even though buffer 603 may be empty, as will be discussed below. Thus, in accord with an aspect of the invention, each port circuit channel number associated with a computer that is served by port circuit 101-1 is assigned what we call a virtual FIFO whose capacity may increase or decrease as required.

Port circuit 101-1 tracks such linking and unlinking of data buffers forming a virtual FIFO by maintaining a channel record that is assigned to the associated channel number, as shown in FIG. 3. Specifically, channel records are stored in section 302 of memory 300, and may be indexed using a respective channel number. For example, channel record 1 is associated with channel 1, channel record 2 is associated with channel 2, and so on. Thus, a port circuit uses a channel number as a memory section 302 index to access the associated channel record.

Briefly referring to FIG. 4, it is seen that a channel record includes a plurality of fields for the storage of respective pointers and other information. Included in such pointers is Head Pointer (HP) 302-11, which points to the last data entry of the last data buffer currently assigned to the respective channel number, and Tail Pointer (TP) 302-21, which points to the first data entry of the first data buffer in a chain of data buffers, if any. The other information is inserted in field 302-22.

Returning to FIG. 3, the linking between data buffers forming a chain of data buffers, if any, is tracked by buffer link records forming section 303 of memory 300. That is, a section 303 link record associated with a data buffer in a chain of data buffers identifies the address of the next succeeding data buffer in the chain. In an illustrative embodiment of the invention, a memory section 303 link record is accessed using what we call a logical index. In an implementation of the invention, a logical index is generated by shifting the contents of a particular scratch register to the right by five bit locations and then inserting a zero in each of the two low-order bit locations. A particular section 303 link record is then accessed using the starting address of memory section 303 as indexed by a logical index.

Section 304 of memory 300 serves as a conventional circulating register for the storage of addresses identifying available data buffers, i.e., "free" data buffers. During the aforementioned initialization, the associated port circuit, e.g., port 101-1, stores the addresses of respective "free" data buffers in sequential locations of memory section 304. In an illustrative embodiment of the invention and as will be explained below, a pointer (Read Free Pointer) is used to identify the section 304 location containing the address of the next free data buffer. As will also be explained below, the address of a linked data buffer that no longer contains data, i.e., is made available for use (free), is stored in a section 304 location identified by another pointer (Write Free Pointer).

Figure 5:
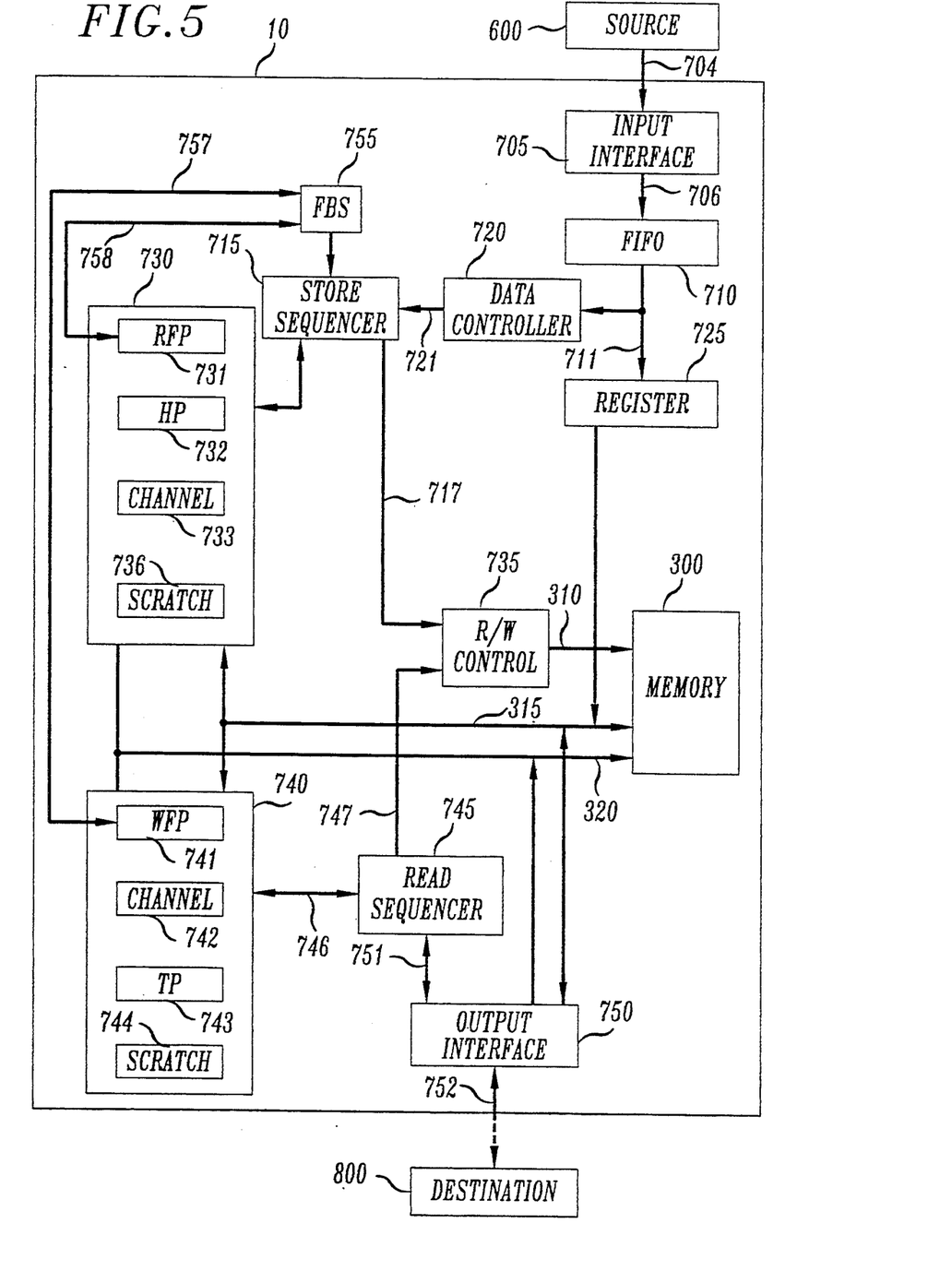
FIG. 5 is an illustrative broad block diagram of a port circuit of FIG. 1.

Turning now to FIG. 5, interface circuit 705 is arranged to receive from a source 600, such as, for example, host computer 50-1, a stream of data packets. The originators of such data packets may be the devices that source 600 serves, such as computers 60-1 through 60-N. Input interface circuit 705, inter alia, stores data words (bytes) as they are received in sequential memory locations of conventional memory FIFO 710 via bus 706, in which a plurality of such data bytes form a respective data packet.

Data controller 720 serves as one of the means for transferring data bytes that have been stored in FIFO 710 to a respective data buffer. In particular, controller 720 unloads a data packet four bytes (words) at a time in the order that the bytes were stored in FIFO 710. Controller 720 then stores the unloaded data bytes in register 725 via bus 711. Controller 720 then checks via bus 711 the contents of register 725 to determine if such contents represents a channel number, thereby indicating the beginning of a packet. If that is not the case, then controller 720 notifies sequencer 715 that a new set of data bytes of an incoming data packet has been stored in register 725.

Assume that a newly arrived channel number has been stored in register 725. In that event then, sequencer 715 causes particular information contained in register 732 and associated with a preceding data packet processed by sequencer 715 to be stored in the respective channel record, as will be explained below. Sequencer 715 then directs register 725 to output the new channel number to data bus 315 so that the number may be latched in channel register 733. Sequencer 715 then unloads from memory section 302 the channel record associated with the new channel address contained in channel register 733. In doing so, sequencer 715 places on address bus 320 the starting address of memory section 302 as indexed by the contents of register 733. Sequencer 715 then prompts R/W (Read/Write) control circuit 735 to assert a read signal on lead 310. Memory 300 in response thereto and in a conventional manner reads and then outputs to data bus 315 the contents of the addressed section 302 location. Sequencer 715, in turn, causes the information appearing on data bus 315 and, in particular, the value relating to the aforementioned data buffer Head Pointer (HP) to be stored in register 732. Sequencer 715 then waits for receipt via path 721 of a controller 720 notification indicating that the next set of data bytes has been stored in register 725.

In response to such notification, sequencer 715 causes the contents of registers 725 and 732 to be placed on data and address busses 315 and 310, respectively. Sequencer 715 then prompts R/W control 735 to assert on lead 310 a write signal, thereby causing memory 300 to store in the addressed data buffer the information appearing on bus 320. Sequencer 715 then increments the contents of HP register 732 by a predetermined value—illustratively a value of four—so that such contents point to the next location of the data buffer currently associated with the channel number contained in register 733. Sequencer 715 then waits for receipt of the next such notification.

Similarly, controller 720 unloads the next four data bytes from FIFO 710 and stores them in register 725. Assume that the data bytes that are now stored in register 725 are part of the data packet associated with the channel number stored in register 733. In that event, then, controller 720 notifies sequencer 715 of that fact, as mentioned above. Sequencer 715, in the manner described above, stores the data bytes in the data buffer location identified by the current contents of HP register 732. Sequencer 715, as mentioned above, then increments register 732. The associated port circuit continues processing data bytes successively stored in register 725 until that register contains a channel number that is different from the channel number currently contained in register 733, thereby possibly indicating the start of a data packet associated with another channel number. In that event, sequencer 715 causes the head pointer contained in register 732 to be stored in the channel record associated with the channel number currently contained in register 733. Sequencer 715 accomplishes that task by causing the contents of register 733 as well as the memory section 302 starting address to be placed on address bus 320. In addition, sequencer 715 causes the contents of register 732 to placed on data bus 315. Sequencer 715 then prompts R/W circuit 735 to assert a signal on lead 310. Memory 300, in response thereto, stores the data on bus 315 in the addressed channel record.

As mentioned above, a data buffer comprises illustratively 128 data bytes, such that each such data buffer starts at a 128 byte boundary of section 301 memory. Since seven binary bits may be used to track a maximum count of 127, then the lowest seven bits of the contents of HP register 732 may be used to indicate when a data buffer is full. Accordingly, if register 732 contains a count of 124 and is incremented by a value of four, then the low-order seven bits of the contents of register 732 would have a value of zero, thereby indicating that the associated data buffer is full. To determine when a data buffer is full, sequencer 715 thus "tests" the contents of register 732 each time it increments that register. If sequencer 715 finds that the low-order seven bits of register 732 equals zero, then sequencer 715 links a free buffer to the current "full" data buffer associated with the channel number contained in register 733.

To track the location of the next "free" data buffer, a port circuit, during initialization, stores the address of the first section 304 memory location in RFP (Read Free Pointer) register 731 and stores the address of the last section 304 memory location in WFP (Write Free Pointer) register 741. In addition, the associated port circuit stores in the first location of memory section 304 the address of the first free data buffer. The port circuit also stores the addresses of the remaining free data buffers in respective succeeding section 304 locations.

Accordingly, sequencer 715 may link a free data buffer to a full data buffer assigned to the channel number contained in register 733 to create a chain of data buffers, i.e., a virtual FIFO. To do so, sequencer 715 obtains a free buffer and then links that buffer to a full data buffer. In particular, sequencer 715 causes the address of a memory location in memory section 304 as indexed by the contents of RFP register 731 to be placed on address bus 320. Sequencer 715 then prompts R/W control 735 to assert a read signal on lead 310. Memory 300 responsive thereto reads and places on data bus 315 the contents of the addressed memory 304 location. Sequencer 715, in turn, causes the information appearing on data bus 315 to be stored in scratch register 736. Sequencer 715 then links the newly acquired data buffer to the full buffer by (a) causing the contents of scratch register 736 to be placed on data bus 315, and (b) causing the address of memory section 304 modified by a logical index derived from the contents of HP register 732 to be placed on address bus 320. Sequencer 715 then prompts R/W control circuit to assert a write signal on lead 301. Memory 300 in response thereto stores the address of the newly acquired buffer in the section 303 link associated with the full data buffer. Sequencer 715 then causes the data buffer address that had been placed on data bus 315 to be stored in HP register 732. In addition, sequencer 715 increments the contents of RFP register 731 by a value of one, so that such contents points to the memory section 304 location containing the address of the next free data buffer. (It is noted that register 731 is arranged as a modulo k counter such that, when the contents of register 731 reaches a value of k and the register is incremented, then such contents cycles automatically to point to the first location of memory section 304.)

The unloading of data words from memory 300 data buffers for delivery to an intended destination is handled by read sequencer 745 responsive to receiving a respective request message from output interface 750. The originator of such a request message may be another circuit, which may be contained in the associated packet switch and which communicates with interface 750 via path 752. Alternatively, an originator of such a request ("request originator") may be external to the associated packet switch. Destination 800 represents the various intended recipients of data packets that have been stored in memory 300. The dashed portion of path 752 represents a path through the associated packet switch, e.g., switch 100, and communications paths that may be traversed to reach such recipients, in which such communications paths may be routed through one or more other packet switches.

In particular, data packets associated with a particular channel number may be unloaded from memory 300 by first supplying to output interface 750 via bus 752 a request message identifying the particular channel number. Output interface 750 responsive to receipt of the message notifies read sequencer 745 via bus 751 and outputs to data bus 302 the channel number contained in the request message. Read sequencer 745 responsive to such notification (a) causes the channel number appearing on bus 320 to be stored in channel register 742, and (b) obtains from memory 300 the record associated with that channel number. That is, read sequencer 745 (a) places on address bus 320 the start address of memory section 302 indexed by the channel number stored in register 742 and (b) causes R/W circuit to assert a read signal on lead 310. Similarly, memory 300 in response thereto outputs to data bus 315 a copy of the information stored at the addressed channel record location. Sequencer 745, in turn, causes the information contained in the Tail Pointer (TP) field of the channel record appearing on data bus 302 to be stored in TP register 743. Sequencer 745 then waits for a request to read the data stored in the data buffer location identified by the contents of register 743.

In an illustrative embodiment of the invention, read sequencer 745 unloads from memory 300 one data buffer location for each request for data that it receives via output interface 750. Accordingly, to obtain a stored data packet associated with the channel number stored in register 742, the aforementioned originator supplies a series of data requests to output interface 750. Output interface 750, in turn, supplies each such request as it is received to sequencer 745 via bus 751. Alternatively, the request originator may obtain via interface 750 a copy of the channel record. In this way, the request originator may determine the number of requests that need to be supplied to sequencer 745 to obtain all, or a part of such data.

Specifically, responsive to receipt of a request for data associated with the channel number that is stored in register 742, read sequencer 745 causes the contents of TP register 743 to be placed on address bus 320. In addition, read sequencer 745 prompts R/W control circuit 735 to assert a read signal on lead 301. Similarly, memory 300 in response thereto reads and places on data bus 315 for delivery to interface 750 the contents of the addressed data buffer location. Output interface 750, in turn, outputs the data appearing on bus 315 to bus 752.

Following the foregoing, read sequencer 745 increments by a predetermined value—illustratively four—the contents of TP register 743 so that such contents point to the next location of the data buffer that is to be read. Accordingly, sequencer 745 operates in the foregoing fashion responsive to receipt of a subsequent data request or channel change request. In response to a channel change request, sequencer 745 (a) stores the contents of register 743 in the TP field of the section 302 record associated with the channel number contained in register 742, (b) directs output interface 750 to output the new channel number to data bus 315, and (c) then causes the contents of data bus 315 to be latched into register 742. Read sequencer 745 then obtains in the described manner the section 302 record associated with the newly received channel number and then waits for receipt of a data request.

Like store sequencer 715, read sequencer 745 checks the value of the contents of register 743 each time such contents is incremented. If sequencer 745 finds that the low-order bits—illustratively bits 0 through 6—of such contents equal zero, then sequencer 745 concludes that the data buffer that it had just addressed is empty. In that instance, then, read sequencer 745 unlinks the data buffer if it happens to be one of a chain associated with the channel number stored in register 742, and then adds the unlinked buffer to the section 304 list of free data buffers.

In particular, during initialization, the associated port circuit stores in WFP register 741 the address of the next section 304 location that is to be used for entering the address of the next data buffer that is completely unloaded by sequencer 745. Thereafter, to add the address of an emptied data buffer to the free list, or pool, sequencer 745 causes the contents of registers 743 and 741 to be placed on data and address busses 315 and 320, respectively. Sequencer 745 then prompts R/W control circuit to assert a write signal on lead 301. Memory 300, in response thereto, stores the information contained on data bus 315 in the addressed location. In addition, sequencer 745 causes the information contained on data bus 315 to be stored in scratch register 744. Following the foregoing, sequencer 740 increments the contents of register 741 so that it points to the next location in memory section 304 that is to be used for entering the address of a free data buffer.

To unlink the free data buffer from the chain, sequencer 745, as discussed above, generates a logical index as a function of the contents of scratch register 744 (address of unlinked buffer). Sequencer 745 then causes the address of memory section 303 as indexed by the logical index to be placed on address bus 320. Sequencer 745 then prompts R/W control circuit 735 to assert a read signal on lead 310. Memory 300, in response thereto, outputs the contents of the buffer link associated with the unlinked buffer to data bus 315, in which such contents is the address of the next linked buffer of the chain. Sequencer 745 then causes the information appearing on data bus 315 to be stored in TP register 743.

If the emptied data buffer is not one of a chain of data buffers, then the emptied data buffer remains associated with the channel number contained in register 742.

In an illustrative embodiment of the invention, circuit 10 may also include a Free Buffer Status (FBS) circuit 755, which operates to track the contents of registers 731 and 741. That is, FBS circuit 755 is an arranged to notify sequencer 715 whenever a free data buffer is not available. In particular, FBS circuit 755 compares the contents of register 731 with the contents of register 741 to track the instance in which all of the data buffers are being used. That is, if registers 731 and 741 contain the same value, then both registers are pointing to the same memory section 304 location, thereby indicating that a free buffer is not available. If such a condition occurs, then FBS circuit 755 notifies sequencer 715 of that fact via lead 756. Sequencer 715 in response thereto stops storing data bytes in memory 300.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A telecommunications switch comprising means for receiving data packets from a plurality of sources of data,
    means for partitioning a memory into a plurality of virtual FIFOs, for associating individual ones of said FIFOs with respective ones of said sources of data and for forming the remaining ones of said FIFOs into a pool of available FIFOs,
    means, operative whenever one of the associated FIFOs becomes full, for linking one of the FIFOs from said pool to said one of the associated FIFOs to increase the capacity of said one of the associated FIFOs to accommodate additional packets as they are received from the associated one of said sources, and
    means, operative whenever said one associated FIFO becomes empty, for then associating that FIFO with said pool.

2. A telecommunications switch comprising
    means for receiving data packets from a plurality of data sources,
    a plurality of a data buffers, individual ones of said data buffers being associated with respective ones of said sources of data and other ones of said data buffer being used to form a pool of data buffers,
    means for storing data packets received from sources in their associated data buffers,
    means, operative whenever one of said associated data buffers becomes full, for then obtaining a data buffer from said pool and linking said obtained data buffer to said one of said associated data buffers in order to increase the capacity of said one data buffer, and
    a memory, said memory being partitioned to form said plurality of data buffers such that the first memory location of each of said data buffers is identified by a memory location address whose lower-ordered bits equal a predetermined value.

3. The telecommunications switch of claim 2 further comprising
    means for unloading data packets from each of said associated data buffers and supplying said unloaded data packets to an output, in which packets are unloaded in the order that they are stored in their associated data buffers, and
    means, operative whenever an associated one of said data buffers becomes empty, for assigning said empty data buffer to said pool if that data buffer is linked to another one of said data buffers.

4. The telecommunications switch of claim 2 wherein each of said data sources is associated with respective tail and head pointers respectively identifying the next location in their associated data buffers that is available for the storage of a data packet and that is to be unloaded, and wherein said packet switch further comprises
    means, operative following the storage of a data packet in said one data buffer, for incrementing the associated head pointer so that it identifies the next available location in said one data buffer, and
    means, operative following the unloading of a data packet from said one data buffer, for incrementing the associated tail pointer so that it identifies the next location in said one data buffer that is to be unloaded.

5. The telecommunications switch of claim 4 further comprising
    means, operative if the value of a predetermined number of low-order bits forming the head pointer identifying a next location in said one data buffer equals a predetermined value as a result of said incrementing, for then linking a data buffer obtained from said pool to said one data buffer to increase the capacity of said one data buffer, and for storing in the associated head pointer the address of the linked data buffer obtained from said pool.

6. The telecommunications switch of claim 4 further comprising
    means, operative if the value of a predetermined number of low-order bits forming the tail pointer identifying a next location in said one data buffer equals a predetermined value as a result of said incrementing, for then assigning said one data buffer to said pool if said one data buffer is linked to another one of said data buffers as a result of said increase.

7. A telecommunications switch, said switch receiving data packets from a plurality of sources of data, said telecommunications switch comprising
    a plurality of data buffers, means for assigning ones of said data buffers to respective ones of said sources, for forming a pool of data buffers using unassigned data buffers and for storing data packets received from said sources in respective ones of said buffers that have been assigned to said sources, means operative when one of the assigned data buffers becomes full for expanding the capacity of said one of the assigned data buffers by linking an unassigned data buffer to the assigned full data buffer, and means, responsive to the full data buffer becoming empty, for then assigning that data buffer to the pool of data buffers.

8. The telecommunications switch of claim 7 further comprising means for unloading data packets from each of said respective ones of said data buffers and supplying said unloaded data packets to an output, in which data packets are unloaded in the order that they are stored in their associated data buffers, and means, operative whenever one of said associated data buffers becomes empty, for assigning said empty data buffer to a pool of data buffers if that data buffer was used to increase the capacity of said one of associated data buffers.

9. The telecommunications switch of claim 7 wherein each of said data sources is associated with respective tail and head pointers respectively identifying the next location in their associated data buffers that is available for the storage of a data packet and that is to be unloaded, and wherein said telecommunications switch further comprises means, operative following the storage of a data packet in said one of said associated data buffers, for incrementing the associated head pointer so that it identifies the next available location in said one of said associated data buffers, and means, operative following the unloading of a data packet from said one data buffer, for incrementing the associated tail pointer so that it identifies the next location in said one data buffer that is to be unloaded.

10. The telecommunications switch of claim 9 further comprising means, operative if the value of a predetermined number of low-order bits forming the head pointer identifying a next location in said one data buffer equals a predetermined value as a result of said incrementing, for then linking a data buffer not associated with any one of said sources to said one data buffer to increase the capacity of said one data buffer, and for storing in the associated head pointer the address of said data buffer not associated with any one of said sources.

11. A method of operating a telecommunications switch port circuit arranged to receive data packets from a plurality of sources of data, said method comprising the steps of partitioning a memory contained in said port circuit into a plurality of data buffers, associating individual ones of said data buffers with respective ones of said sources of data and forming other ones of said data buffers not associated with said sources into a pool of available data buffers, at an input to said port circuit, storing data packets received from said sources in their associated data buffers, and responding whenever one of the associated data buffers becomes full, by linking a data buffer from said pool to the full data buffer in order to store additional data packets that may be received from the data source associated with the full data buffer, and responding when the full data buffer is emptied at an output of said port circuit, by associating the emptied data buffer with the pool of data buffers.

12. The method set forth in claim 11 further comprising the steps of unloading data packets from each of said associated data buffers and supplying the unloaded data packets to an output, in which the packets are unloaded in the order that they are stored in their associated data buffers, and responding when one of said data buffers becomes empty by assigning the emptied data buffer to said pool if that data buffer is linked to another one of said data buffers.

13. The method set forth in claim 11 wherein each of said data sources is associated with respective tail and head pointers respectively identifying the next location in the associated one of said data buffers that is available for the storage of a data packet and that is to be unloaded, and wherein said method further comprises responding following the storage of a data packet in said one data buffer by incrementing the associated head pointer so that it identifies the next available location in said one data buffer, and responding following the unloading of a data packet from said one data buffer by incrementing the associated tail pointer so that it identifies the next location in said one data buffer that is to be unloaded.

14. The method set forth in claim 13 further comprising the step of responding if the value of a predetermined number of low-order bits forming the head pointer identifying a next location in said one data buffer equals a predetermined value as a result of said incrementing by linking a data buffer obtained from said pool to said one data buffer to increase the capacity of said one data buffer, and by storing in the associated head pointer the address of said linked data buffer.

15. The method set forth in claim 13 further comprising the step of responding if the value of a predetermined number of low-order bits forming the tail pointer identifying a next location in said one buffer equals a predetermined value as a result of said incrementing by assigning said one data buffer to said pool if said one data buffer is linked to another one of said data buffers as a result of the increase.

16. A method of operating a telecommunications switch, said switch being arranged to receive data packets from a plurality of sources of data, said method comprising the steps of partitioning a memory associated with said switch into a plurality of data buffers, at an input to said switch, associating ones of said data buffers with respective ones of said sources and storing data packets received from said sources in their associated ones of said data buffers, responding when one of the associated data buffers becomes full by expanding the capacity of said one of the associated data buffers by linking a data buffer not associated with any one of said sources to said one of the associated data buffers, and at an output of said switch, unloading the data packets stored in said one of the associated data buffers, forwarding the data packets to respective destinations, and associating the full data buffer with said pool of data buffers when that data buffer becomes empty.

17. The method of claim 16 further comprising the steps of unloading data packets from each of said associated data buffers and supplying said unloaded data packets to an output, in which the data packets are unloaded in the order that they are stored in their associated data buffers, and responding whenever one of said associated data buffers becomes empty by assigning said emptied data buffer to a pool of data buffers if that data buffer was used to increase the capacity of the one data buffer.

18. The method of claim 16 wherein each of said data sources is associated with respective tail and head pointers respectively identifying the next location in their associated data buffers that is available for the storage of a data packet and that is to be unloaded, and wherein said method further comprises responding following the storage of a data packet in said one of said associated data buffers by incrementing the associated head pointer so that it identifies the next available location in said one data buffer, and responding following the unloading of a data packet from said one data buffer by incrementing the associated tail pointer so that it identifies the next location in said one data buffer that is to be unloaded.

19. The method of claim 18 further comprising the step of responding if the value of a predetermined number of low-order bits forming the head pointer identifying a next location in said one data buffer equals a predetermined value as a result of said incrementing by linking a data buffer not associated with any one of said sources to said one data buffer to increase the capacity of said one data buffer, and by storing in the associated head pointer the address of the linked data buffer not associated with any one of said sources.

20. The method claim 16 wherein said sources of data are associated with respective ones of different types of data services.

* * * * *